United States Patent Office
3,708,496
Patented Jan. 2, 1973

3,708,496
PROCESS FOR PREPARING 1,3-DISUBSTITUTED SYMMETRICAL THIOUREAS
Hilde Kersten, Hellrain 1, Trennfurt, Germany; Gunter Heinrichs, Bechtoldstr. 20, Aschaffenburg, Germany; Gerhard Meyer, Blumenstr. 26, Obernburg, Germany; and Dieter Laudien, Menzelstr. 52, Wuppertal, Germany
No Drawing. Filed Mar. 25, 1971, Ser. No. 128,120
Claims priority, application Germany, Mar. 28, 1970, P 20 15 010.1
Int. Cl. C07c 157/06
U.S. Cl. 260—309.7     14 Claims

ABSTRACT OF THE DISCLOSURE

Process for the preparation of aliphatically and cycloaliphatically 1,3-disubstituted symmetrical thioureas by reacting a primary amine with carbon disulfide in the presence of active carbon.

---

1,3-disubstituted thioureas may be prepared in a known manner by reacting primary amines with carbon disulfide. A dithiocarbamic acid is formed in a first reaction stage according to Equation 1. This almost invariably reacts with a second mol of amine according to Equation 2 to produce the corresponding substituted ammonium dithiocarbamate.

$$R-NH_2 + CS_2 \rightleftharpoons RHN-CS-SH \quad (1)$$

$$RHN-CS-SH + R-NH_2 \rightleftharpoons (RHN-CS-S)^-(NRH_3)^+ \quad (2)$$

Substituted ammonium dithiocarbamates which are prepared from aliphatic or cycloaliphatic primary amines are stable. Those which are prepared from aromatic amines, i.e. where R is an aromatic group such as phenyl, are less stable and generally cannot be isolated but decompose according to Equations 3 and 4 with the formation of 1,3-disubstituted thiourea:

$$(RHN-CS-S)^-(NRH_3)^+ \rightarrow R-NCS + R-NH_2 + H_2S \quad (3)$$

$$R-NCS + R-NH_2 \rightarrow RHN-CS-NHR \quad (4)$$

Dithiocarbamates obtained from primary aliphatic or cycloaliphatic amines decompose according to Equations 3 and 4 only when heated, forming the corresponding thioureas. Note the disclosure by D.C. Schroeder, Chem. Reviews 55 (1955), pages 189 et seq. For the preparation of aliphatically or cycloaliphatically substituted thioureas, the addition reaction of carbon disulfide with amine may first be carried out at low temperatures, the dithiocarbamate then being isolated and converted at elevated temperatures into the disubstituted thiourea. On the other hand, the reaction may also be carried out in a single stage at elevated temperatures without isolating the dithiocarbamate.

Aliphatically or cycloaliphatically substituted thioureas may also be prepared by reacting amines with thiophosgene (Schroeder, supra, page 193). This process is not suitable for the preparation of disubstituted thioureas on an industrial scale because thiophosgene is relatively expensive. Furthermore, aliphaticallly or cycloaliphatically disubstituted thioureas may be prepared by reacting isothiocyanic acid esters with amines (Schroeder, supra, page 194). This process is normally used only for the preparation of asymmetrically substituted thioureas. It is much less suitable as an industrial process for the preparation of symmetrically substituted thioureas because the isothiocyanic acid esters must first be prepared by reacting alkyl halides with thiocyanic acid salts or by the rearrangement of thiocyanic acid esters or from dithiocarbamic acid salts.

One object of the present invention is to provide a process for the preparation of aliphatically or cycloaliphatically 1,3-disubstituted symmetrical thioureas which proceeds rapidly and with high yields to the desired products and which can be carried out under easily controlled conditions and on a large industrial or technical scale. These and other objects and advantages of the invention will be explained in greater detail in conjunction with the following specification.

It has now been found, in accordance with the invention, that primary aliphatic and cycloaliphatic amines react rapidly with carbon disulfide with or without a solvent in the liquid phase to produce high yields of aliphatically or cycloaliphatically 1,3-disubstituted thioureas provided that the reaction is carried out on or in contact with active carbon.

The initial reactants for the process are readily available, and it is feasible to employ a commercial grade of carbon disulfide or to obtain it directly from other industrial processes. The aliphatic and cycloaliphatic amines are those primary amines previously used to prepare the thioureas and known to include a wide range of useful reactants. Saturated alkyl or cycloalkyl primary monoamines are especially ppreferred, i.e. wherein the compound contains in addition to the single functional primary amino group only carbon and hydrogen atoms in a saturated chain or ring structure. These primary amines may contain up to about 18 carbon atoms, the alkylamines preferably being those of 2 to 16 carbon atoms, especially 2 to 10 carbon atoms, while the cycloalkylamines preferably contain 6 to 8 carbon atoms. Even when using less desirable reactants, however, the present invention still represents a substantial improvement over the corresponding process carried out in the absence of a catalyst, particularly in the absence of active carbon as the essential catalyst.

The following compounds are specific examples of primary amines which may be used in the process of the invention: ethylamine, n-propylamine, n-butylamine, n-hexylamine, cyclohexylamine, n-hexyldecylamine, i-propylamine and t-butylamine.

The amine and carbon disulfide are preferably put into the reaction in a molar ratio of 3:1 to 1:1 and more preferably in about stoichiometric proportions, i.e. a molar ratio of amine:$CS_2$ of approximately 2:1. The reaction is preferably carried out at temperatures of about 20° C. to 250° C., more preferably from about 30° C. to 220° C.

The process according to the invention may be carried out in various different manners either continuously or intermittently and either with or without an inert organic solvent. It is essential however that a reaction zone be provided which contains the active carbon, preferably as a fixed bed catalyst.

The active carbon can be obtained from any commercial source as a catalytically active material, i.e. as a granular or finely divided carbon having a high surface area per unit weight, for example on the order of 700 to 1700 m.$^2$g. The preparation or activation of such carbon catalyst can be accomplished by those conventional methods which tend to provide the highest catalytic activity, e.g. as distinguished from relatively inactive carbons used for other purposes. It is preferable to employ a very highly abrasion-resistant activated carbon having a particle size of about 0.1 to 10 mm., preferably 2.5 to 4 mm. In general, however, a wide range of activated carbons can be employed with a significant improvement of results.

The process according to the invention is advantageously carried out in an elongated reaction tube or zone which is filled with granular active carbon as a fixed bed and into which the primary amine and carbon disulfide reactants are introduced, a temperature of about 50° C. to 220° C. being maintained in the reaction zone. Amine and carbon disulfide are advantageously introduced in a stochiometric molar ratio into the top or upper end of the reaction tube which is filled with the granular active carbon and the reaction product is removed as a melt from the lower end of the reaction tube and can then be easily caused to crystallize, e.g. by slow cooling or the like.

The reaction temperature employed for this method is advantageously above the melting points of both the intermediate and final products. The symmetrically substituted thiourea as the final product generally melts at a higher temperature than the aminodithiocarbamate which is formed as intermediate product. In these cases, the reaction temperature employed is slightly above the melting point of the thiourea which is being produced. If the thiourea being produced has a lower melting point than the aminodithiocarbamate formed as the intermediate product, as for example in the case of n-hexylamine, a reaction temperature which is slightly above the melting point of the aminodithiocarbamate is employed.

According to still another embodiment, the process according to the invention is carried out with an inert organic solvent, the solution of carbon disulfide and amine in the solvent preferably being reacted in an elongated reaction tube or zone which is filled with granular active carbon as a fixed bed catalyst and in which a temperature of 30° C. to 180° C., preferably 50° C. to 100° C., is maintained in the reaction zone. A solution of an approximately stoichiometric amount of the carbon disulfide and the primary aliphatic or cycloaliphatic amine in an inert solvent are advantageously introduced into the upper part of a reaction tube which is filled with the granular active carbon, and the solution containing reaction product can be withdrawn from the lower part of the reaction tube and the solvent separated from the product. Suitable inert solvents include, for example, alcohols, dimethyl formamide, dioxan, water and aromatic hydrocarbons. Lower alkanols and especially ethanol are particularly useful. The solvent should have a boiling point above the reaction temperature employed in each instance.

If a reaction tube or zone filled with active carbon is used, the length of the column or bed of active carbon required depends on the rate of throughput and the reaction temperature employed. The minimum length of the bed or layer of active carbon as required for obtaining the highest possible yield can easily be determined in each case by a few simple routine tests. The activity of the active charcoal is undiminished even after a long time in use.

The process according to the invention is especially advantageous because it enables high conversion rates to be achieved together with high yields. Also, if an inert solvent is used, substantially lower reaction temperatures are sufficient for quantitatively converting the dithiocarbamate than is the case when no active carbon is used.

The process of the invention is further illustrated by but not restricted to the following examples.

EXAMPLE 1

The apparatus used consisted substantially of a heatable upright double-walled glass reaction tube having a length of 1000 mm. and an internal diameter of 25 mm., the interior of the tube being filled with 85 g. of granular active carbon having a particle size of 2.5 mm. (obtained from Fa. Merck. Darmstadt). A solution of 73 g. (1 mol) of n-butylamine was added dropwise to a solution of 38 g. (0.5 mol) of carbon disulfide in 40 ml. of ethanol at 5° C. to 10° C. with stirring. The resulting colorless, clear solution was dripped onto the top end of the bed of active carbon at a rate of 100 gms. per hour while a temperature of 90° C. was maintained in the reaction tube. The reaction mixture leaving the lower end of the reaction tube was collected in a cooled receiver. After removal of the solvent by distillation, the N,N'-di-n-butyl-thiourea product was obtained in a yield of 89 g. (95% of theory), M.P.=64° C. After recrystallization from cyclohexane, the product was analytically pure, M.P.=65° C.

EXAMPLE 2

The apparatus described in Example 1 was used with the same active carbon granules. A solution of 38 g. (0.5 mol) of carbon disulfide in 40 ml. of ethanol and a solution of 73 g. (1 mol) of n-butylamine in 110 ml. of ethanol were supplied to the top end of the bed or layer of active carbon. The rate of throughput was 100 grams per hour, the temperature in the reaction tube being maintained at 80° C. The reaction mixture leaving at the lower end of the reaction tube was worked up as described in Example 1 and yielded 89 g. (95% of theory) of N,N'-di-n-butyl-thiourea having a melting point of 64° C.

EXAMPLE 3

The apparatus filled with granular active carbon as described in Example 1 was again used. 38 g. (0.5 mol) of carbon disulfide and 73 g. (1 mol) of n-butylamine were introduced simultaneously into the top end of the bed of active carbon. The rate of throughput was 100 grams per hour, and the temperature in the reaction tube was maintained at about 90° C. to 100° C. N,N'-di-n-butyl-thiourea was removed as a melt at the lower end of the reaction tube and freed from dissolved hydrogen sulfide in a vacuum. The yield was 86 g. (92% of theory), M.P.=64° C.

EXAMPLE 4

An upright, heatable double-walled reaction tube made of glass and having a length of 250 mm. and an internal diameter of 25 mm. was used. The interior of this tube was filled with 20 grams of the active carbon used in Example 1 and heated to 200° C. 38 g. (0.5 mol) of carbon disulfide and 99.2 g. (1 mol) of cyclohexylamine were introduced at the top end of the bed of active carbon. The rate of throughout was 100 grams per hour. N,N'-dicyclohexyl-thiourea was removed at the lower end in the form of a melt having a melting point of 178° C. The yield was 113 g. (94% of the theory). After recrystallization of the crude product from benzene, the substance was analytically pure and had a melting point of 181° C.

EXAMPLE 5

The apparatus and granular active carbon described in Example 1 were again used. Stoichiometric quantities of carbon disulfide and n-hexylamine, i.e. a molar ratio of amine:$CS_2$ of 2:1, were introduced simultaneously into the top end of the bed of active carbon. The rate of throughput was 100 grams per hour and the reaction temperature was 100° C. N,N'-di-n-hexyl-thiourea was removed in the form of a melt at the bottom of the tube in a yield of 91% of theory and freed from dissolved hydrogen sulfide in a vacuum. The crude product, which had a melting point of 40° C., was analytically pure after it had been recrystallized once from acetone, the pure product having a melting point of 47° C.

EXAMPLE 6

The apparatus and active carbon described in Example 1 were again used, following the same general procedures as in the preceding examples. Stoichiometric quantities of carbon disulfide and hexadecylamine were introduced simultaneously into the top end of the bed of active carbon. The rate of throughput was 100 grams per hour and the reaction temperature was 100° C. N,N'-di-n-hexyldecyl-thiourea was removed in the form of a molten product having a melting point of 87° to 88° C. The yield was 98% of the theory.

EXAMPLE 7

The apparatus and active carbon used again corresponded to the data given described in Example 1. 50% ethanolic solutions of stoichiometric quantities of carbon disulfide and isopropylamine were introduced at the top end of the bed of active carbon. The rate of throughput was 100 grams per hour and the reaction temperature was 80° C. The reaction solution was withdrawn at the lower end of the reaction tube and then concentrated by evaporation. N,N'-di-i-propyl-thiourea was obtained as a residue in a yield of 93% of theory, M.P.=141° C.

EXAMPLE 8

The apparatus and granular active carbon described in Example 1 were again used. 50% ethanolic solutions of stoichiometric quantities of carbon disulfide and t-butylamine were introduced at the top end of the bed of active carbon. The rate of throughput was 100 grams per hour and the reaction temperature was 80° C. The reaction solution was continuously withdrawn at the lower end of the reaction tube and then concentrated by evaporation. N,N'-di-t-butyl-thiourea was obtained as a residue in a yield of 92% of theory, M.P.=45° C.

Results similar to those in the preceding examples have been achieved when using still other primary amines as reactants and with or without the same or other inert organic solvents. In general, the inert solvent is especially preferred so as to achieve high yields at relatively lower temperatures.

Further examples of the process of the invention may be tabulated as follows:

N,N'-di-methyl-thiourea
N,N'-di-ethyl-thiourea
N,N'-di-n-octyl-thiourea
N,N'-bis-(2-methoxy-ethylene)-thiourea
Imidazolidine-thione-2

The invention is hereby claimed as follows:

1. In a process for the production of a 1,3-disubstituted symmetrical thiourea in the liquid phase by reacting carbon disulfide with a primary aliphatic or cycloaliphatic amine, the improvement which comprises carrying out said reaction on active carbon.

2. A process as claimed in claim 1 wherein the molar ratio of the amine to the carbon disulfide is from 3:1 to 1:3.

3. A process as claimed in claim 1 wherein the molar ratio of the amine to the carbon disulfide is approximately 2:1.

4. A process as claimed in claim 1 wherein the reaction is carried out in an inert solvent.

5. A process as claimed in claim 1 wherein the reaction is carried out at a temperature of about 20° C. to 250° C.

6. A process as claimed in claim 1 wherein the reaction is carried out at a temperature of about 30° C. to 220° C.

7. A process as claimed in claim 1 wherein the reaction is carried out continuously by leading the reactants through an elongated reaction zone filled with granular active carbon, a temperature of about 50° C. to 220° C. being maintained in said reaction zone.

8. A process as claimed in claim 7 wherein the reaction temperature is maintained above the melting point of the intermediate and final products of the reaction.

9. A process as claimed in claim 1 wherein the reaction is carried out continuously in an elongated vertical reaction zone filled with a fixed bed of granular active carbon, the amine and carbon disulfide being introduced in a molar ratio of approximately 2:1 at the upper end of the reaction zone while withdrawing the final product as a melt at the lower end of the reaction zone and crystallizing the molten final product.

10. A process as claimed in claim 9 wherein the reaction temperature is maintained above the melting point of the intermediate and final products of the reaction.

11. A process as claimed in claim 7 wherein the reactants are introduced into said reaction zone dissolved in an inert organic solvent and the reaction temperature is maintained at about 30° C. to 180° C.

12. A process as claimed in claim 11 wherein the reaction temperature is maintained at about 50° C. to 100° C.

13. A process as claimed in claim 11 wherein the reactants in said inert solvent are introduced at the upper end of an elongated reaction zone filled with a fixed bed of active carbon and a solution of the final reaction product in said inert solvent is withdrawn at the lower end of the reaction zone, and then separating the solvent from the product.

14. A process as claimed in claim 13 wherein the reaction temperature is maintained at about 50° C. to 100° C.

References Cited

UNITED STATES PATENTS 2,966,516  12/1960  Applegath et al. ___ 260—555 S
3,293,293  12/1966  Dreier et al. _____ 260—552 R LEON ZITVER, Primary Examiner M. W. GLYNN, Assistant Examiner U.S. Cl. X.R.
260—501.12, 552 R

PO-1050
(5/69)

UNITED STATES PATENT OFFICE
CERTIFICATE OF CORRECTION

Patent No. 3,708,496  Dated January 2, 1973

Inventor(s) Hilde Kersten et al

It is certified that error appears in the above-identified patent and that said Letters Patent are hereby corrected as shown below:

Column 1, line 8, insert -- , assignors to Glanzstoff AG, Wuppertal, Germany --; line 41, "$(NRH_3{}^+$" should read -- $(NRH_3)^+$ --.

Column 2, line 61, "1700 m.$^2$g." should read -- 1700 m.$^2$/g. --; line 26, "ppreferred" should read -- preferred --.

Column 5, line 36, "N,N'-bis-(2-methoxy-ethylene)-thiourea" should read -- N,N'-di-bis-(2-methoxy-ethylene)-thiourea --.

Signed and sealed this 27th day of November 1973.

(SEAL)
Attest:

EDWARD M. FLETCHER, JR.
Attesting Officer

RENE D. TEGTMEYER
Acting Commissioner of Patents